United States Patent
Hsu et al.

(10) Patent No.: US 8,442,438 B2
(45) Date of Patent: May 14, 2013

(54) WIRELESS TRANSMITTER AND RELATED MULTIMEDIA SYSTEM

(75) Inventors: Cheng-Hsiung Hsu, Taipei Hsien (TW); Chung-Wei Hsu, Taipei Hsien (TW); Cheng-Yen Wen, Taipei Hsien (TW); Chun-Chia Kuo, Taipei Hsien (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 412 days.

(21) Appl. No.: 12/828,233

(22) Filed: Jun. 30, 2010

(65) Prior Publication Data

US 2011/0026634 A1    Feb. 3, 2011

(30) Foreign Application Priority Data

Aug. 3, 2009   (TW) ............................... 98126061 A

(51) Int. Cl.
*H04B 1/00*         (2006.01)
(52) U.S. Cl.
USPC ........ 455/42; 455/3.02; 455/3.06; 455/414.4; 455/114.2; 455/127.1; 455/131; 455/142; 381/311; 244/158.5; 342/352; 342/357.2
(58) Field of Classification Search ............ 455/42, 455/3.02, 3.06, 414.4, 114.2, 114.3, 118, 455/127.1, 131, 142, 205; 381/311; 244/158.5; 342/352, 357.2
See application file for complete search history.

(56) References Cited

U.S. PATENT DOCUMENTS

| | | | | |
|---|---|---|---|---|
| 6,324,592 | B1 * | 11/2001 | Hindman | 710/3 |
| 6,810,233 | B2 * | 10/2004 | Patsiokas | 455/3.02 |
| 7,177,589 | B1 * | 2/2007 | Lynch | 455/3.04 |
| 7,292,835 | B2 * | 11/2007 | Sorrells et al. | 455/313 |
| 7,463,890 | B2 * | 12/2008 | Herz et al. | 455/445 |
| 7,610,011 | B2 * | 10/2009 | Albrett | 455/3.04 |
| 7,773,938 | B2 * | 8/2010 | Voto | 455/3.02 |
| 7,778,595 | B2 * | 8/2010 | White et al. | 455/3.06 |
| 7,792,498 | B2 * | 9/2010 | Tsfaty et al. | 455/88 |
| 7,822,380 | B2 * | 10/2010 | Wu | 455/3.01 |
| 7,917,081 | B2 * | 3/2011 | Voto et al. | 455/3.02 |
| 7,937,040 | B2 * | 5/2011 | Dayan | 455/41.2 |
| 7,957,696 | B2 * | 6/2011 | Der | 455/41.2 |
| 8,031,060 | B2 * | 10/2011 | Hoffberg et al. | 340/426.16 |
| 8,150,346 | B2 * | 4/2012 | Elenes et al. | 455/161.3 |

* cited by examiner

*Primary Examiner* — Marceau Milord
(74) *Attorney, Agent, or Firm* — Winston Hsu; Scott Margo

(57) ABSTRACT

A wireless transmitter includes a first filtering unit coupled to a first cable for outputting a first DC source transmitted on the first cable, a first power converting unit for converting the first DC source into a second DC source, a second filtering unit for eliminating noise in the second DC source, a first DC blocking unit for blocking the second DC source and outputting a second frequency modulation (FM) signal, an amplifier for amplifying the second FM signal to generate a first FM signal, and a second DC blocking unit coupled to the amplifier and the first cable, for outputting the first FM signal to the first cable, such that the first FM signal is transmitted to the air through the first cable as a transmitting antenna.

17 Claims, 4 Drawing Sheets

WIRELESS TRANSMITTER AND RELATED MULTIMEDIA SYSTEM

BACKGROUND OF THE INVENTION

1. Field of the Invention

The present invention relates to a wireless transmitter and related multimedia system, and more particularly, to a wireless transmitter capable of transmitting a frequency modulation signal with a DC source signal and related multimedia system.

2. Description of the Prior Art

Satellite radio is a broadcasting technique following amplitude modulation (AM) and frequency modulation (FM) radio, which has better spectral utilization efficiency for solving a problem of the lack of available broadcasting cannels. Moreover, vehicle communication and multimedia service, such as satellite navigation, radio and video programs, etc, are gradually taken account of for the public. However, a general vehicle multimedia system can only receive AM and FM radio, but has no built-in function of receiving satellite radio. If a user wants to listen to a satellite radio program during driving, a satellite radio receiver needs to be installed in the vehicle for high-quality satellite radio and additional data service functionality.

The conventional satellite radio receiver is not only used for demodulating satellite radio signals, but is also used for transmitting content of satellite radio to a frequency modulation (FM) demodulator of the vehicle in an FM signal form. After the content of the satellite radio is transmitted to the FM demodulator, the content of the satellite radio is played by audio equipment. In addition, a cigarette lighter adapter (CLA) is an integral part of vehicle electronic equipment, and is used for adapting power to a mobile phone, a multimedia player or a satellite radio receiver, etc. The conventional CLA has a built-in FM signal transmission function for transmitting music content stored in the external multimedia player to the FM demodulator to generate a demodulated audio signal, and then the demodulated audio signal is played by the audio equipment.

Please refer to FIG. 1, which is a schematic diagram of a vehicle multimedia system 10 according to the prior art. The vehicle multimedia system 10 includes a satellite radio receiver 110, a CLA 120, a cable 130, an FM receiving antenna 140, an FM demodulator 150, and a speaker 160. The satellite radio receiver 110 includes a satellite receiving antenna 112, a signal converting circuit 114, and an FM transmitting antenna 116. The signal converting circuit 114 is used for converting a satellite radio signal received from the satellite receiving antenna 112 into an FM signal, and transmitting the FM signal to the air through the FM transmitting antenna 116. The CLA 120 is coupled to a power supply 12, and is used for converting power outputted from the power supply 12 into power required by the satellite radio receiver 110, and transmitting the power to the satellite radio receiver 110 though the cable 130. The CLA 120 includes an FM transmission circuit 122 and an FM transmitting antenna 124. The FM transmitting circuit 122 is used for converting a desired audio signal into an FM signal, and transmitting the FM signal through the FM transmitting antenna 124. The FM receiving antenna 140 receives the FM signal transmitted from the FM transmitting antenna 116 of the satellite radio receiver 110 or the FM transmitting antenna 124 of the CLA 120, and then transmits the FM signal to the FM demodulator 150 for demodulation. Finally, the demodulated audio signal is transmitted to the speaker 160 and is played.

For the conventional vehicle multimedia system 10, the FM transmitting antenna 116 of the satellite radio receiver 110 is usually installed on vehicle housing, and has to be closed enough to the FM receiving antenna 140, which causes uneasy installation. The FM transmitting antenna 124 of the CLA 120 is usually installed on an internal printed circuit board of the CLA 120, and is rarely an exposed antenna. Therefore, the FM transmitting antenna 124 is easily restricted by a shape of the structure and has poor FM signal transmission function, which decreases the quality of the audio signal. At present, the FM transmission function of the satellite radio receiver 110 and the CLA 120 have not reached the optimization state.

SUMMARY OF THE INVENTION

Therefore, the present invention provides a wireless transmitter and related multimedia system.

The present invention discloses a wireless transmitter which includes a first filtering unit coupled to a first cable, for filtering out an first FM signal transmitted on the first cable, and outputting a first DC source transmitted on the first cable, a first power converting unit coupled to the first filtering unit, for converting the first DC source into a second DC source, a second filtering unit coupled to the first power converting unit, for eliminating noise in the second DC source, a first DC blocking unit for blocking the second DC source and outputting a second FM signal, an amplifier coupled to the first DC blocking unit, for amplifying the second FM signal to generate the first FM signal, and a second DC blocking unit coupled to the amplifier and the first cable, for blocking the first DC source transmitted on the first cable from the amplifier, and outputting the first FM signal to the first cable, to transmit the first FM signal to the air.

The present invention further discloses a multimedia system which includes an FM receiving antenna for receiving a first FM signal, an FM demodulator coupled to the FM receiving antenna, for demodulating the first FM signal to generate a baseband audio signal, a speaker coupled to the FM demodulator, for playing the baseband audio signal, a first cable coupled to a power supply, for transmitting the first FM signal and a first DC source generated by the power supply, a second cable for transmitting a second FM signal and a second DC source, a satellite radio receiver coupled to the second cable, for converting a satellite radio signal into the second FM signal, and a wireless transmitter coupled to the first cable and the second cable, for converting the first DC source into the second DC source, and amplifying the second FM signal to generate the first FM signal, wherein the first FM signal is transmitted to the FM receiving antenna through the first cable.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
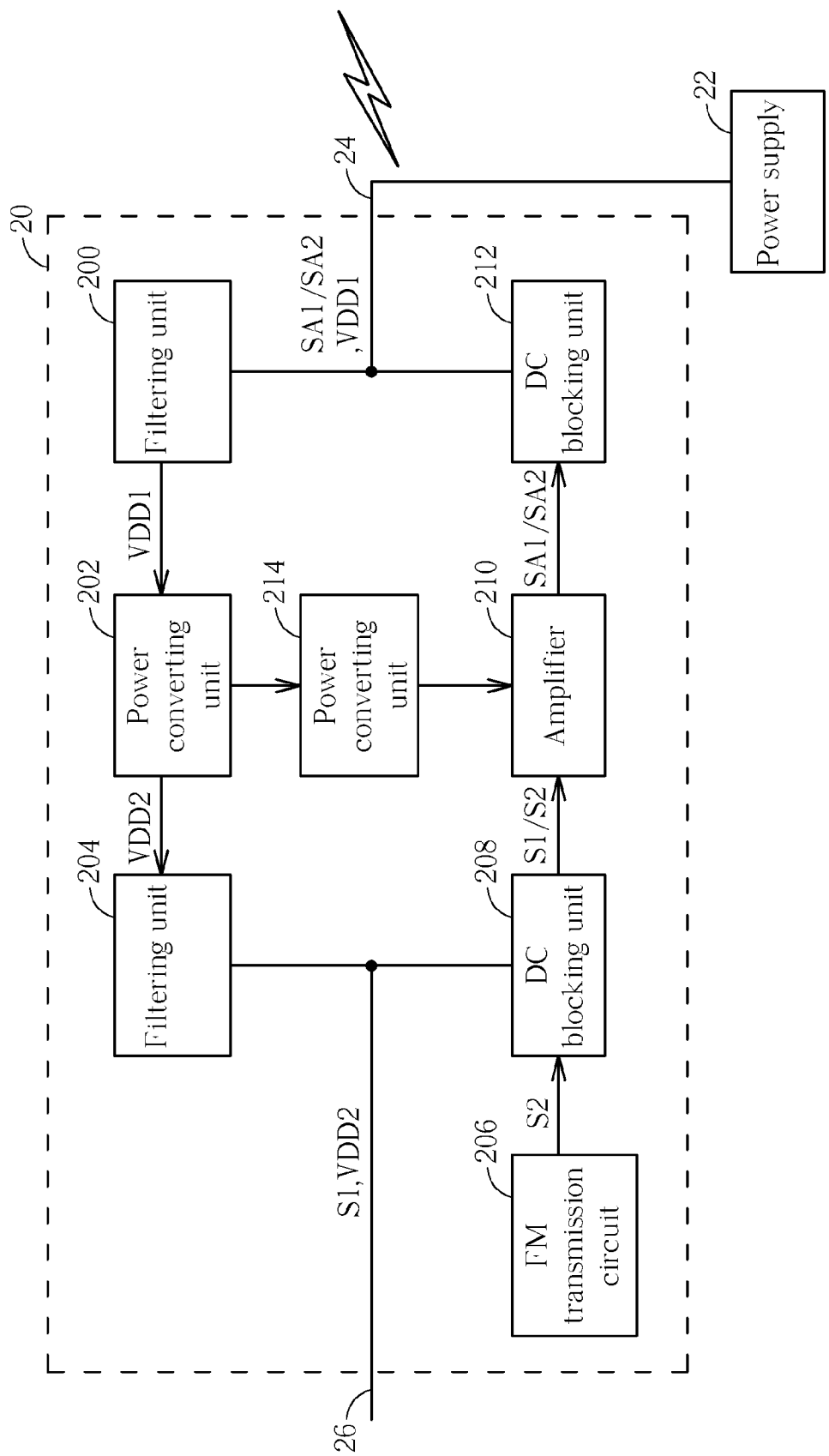
FIG. 2 and FIG. 3 are schematic diagrams of wireless transmitters according to embodiments of the present invention.

Please refer to FIG. 2, which is a schematic diagram of a wireless transmitter 20 according to an embodiment of the present invention. The wireless transmitter 20 is preferably used for realizing a cigarette lighter adapter (CLA), and simultaneously provides power conversion function and frequency modulation (FM) signal transmission function. The wireless transmitter 20 includes filtering units 200 and 204, power converting units 202 and 214, an FM transmission circuit 206, direct current (DC) blocking units 208 and 212, and an amplifier 210. In FIG. 2, the wireless transmitter 20 is coupled to a power supply 22 through a cable 24, and is coupled to an external satellite radio receiver (not shown in FIG. 2) through a cable 26.

The cable 24 is used for transmitting a first DC source outputted from the power supply 22, whose voltage is VDD1. The filtering unit 200 is coupled to the cable 24 and the power converting unit 202, and is used for filtering out an FM signal transmitted on the cable 24, and outputting the first DC source to the power converting unit 202. The power converting unit 202 is used for converting the first DC source outputted from the power supply 22 into a second DC source required by the external satellite radio receiver, whose voltage is VDD2. Take a CLA in the market as an example as follows. An output voltage of a vehicle battery as a power supply is 12V and a voltage required by the satellite radio receiver is 5V. The filtering unit 204 is coupled to the power converting unit 202 and the cable 26. Please note that, the power converting unit 202 is usually a switching power converter which outputs the second DC source including noises, and the filtering unit 204 is used for eliminating the noises in the second DC source. Therefore, the DC source outputted from the filtering unit 204 is clearer than the second DC source outputted from the power converting unit 202. In practice, the filtering units 200 and 204 are composed of inductors and capacitors. The present invention is not limited in a certain inductor and capacitor circuit type or a certain component value.

The cable 26 transmits the DC source outputted from the filtering unit 204 to the external satellite radio receiver. Please note that, the cable 26 is a coaxial cable, and is used for transmitting the DC source (whose voltage is VDD2) outputted from the filtering unit 204 and an FM signal S1which is generated from a satellite radio signal by the satellite radio receiver. The coaxial cable shields the FM signal by a proper grounding plane, to avoid FM signal from fading or being instable.

In addition to the satellite radio receiver, the wireless transmitter 20 is further coupled to a multimedia player, such as a mobile phone or an MP3 player. The FM transmission circuit 206 is used for converting a baseband audio signal desired to be played by the multimedia player into an FM signal S2. The DC blocking unit 208 is coupled to the cable 26 and the FM transmission circuit 206, and is used for blocking the DC source transmitted on the cable 26 and outputting the FM signal S1 and/or the FM signal S2. The amplifier 210 is coupled to the DC blocking unit 208 and the power converting unit 214, and is used for amplifying the FM signal S1 and/or the FM signal S2 to generate FM signal SA1 and/or the FM signal SA2 respectively. The power converting unit 214 is coupled between the amplifier 210 and the power converting unit 202, and is used for generating a third DC source required by the amplifier 210 according to the DC source outputted from the power converting unit 202. The DC blocking unit 212 is coupled to the amplifier 210 and the cable 24, and is used for blocking the first DC source transmitted on the cable 24 from the amplifier 210, to avoid the amplifier 210 from being affected by the first DC source. In addition, the DC blocking unit 212 outputs the FM signal SA1 and/or the FM signal SA2 to the cable 24. As can be seen, the present invention utilizes the cable 24 to transmit the DC source and transmit RF signals as a transmitting antenna does. The cable 24 can be a conventional DC cable.

Figure 1:
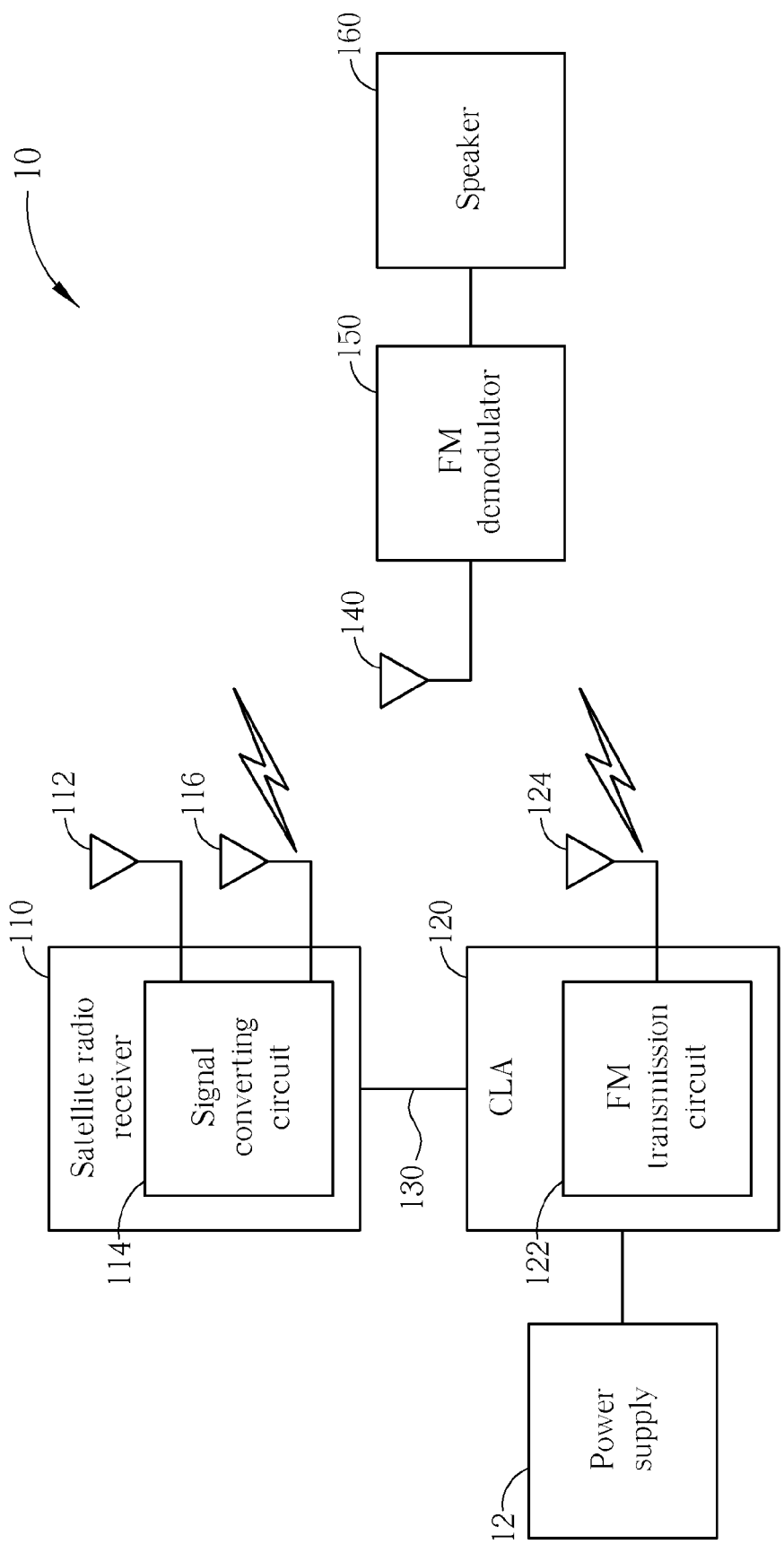
FIG. 1 is a schematic diagram of a vehicle multimedia system according to the prior art.

In a word, the wireless transmitter 20 of FIG. 2 is composed of two main circuit blocks. One is a power converting and filtering circuit, which includes the filtering units 200 and 204, and the power converting units 202 and 214, and the other is a DC blocking and FM signal amplifying circuit, which includes the DC blocking units 208 and 212, and the amplifier 210. The wireless transmitter 20 separates the DC source from the FM signal through the abovementioned circuit blocks, and the DC source is only transmitted with the FM signal on the cables 24 and 26. Note that, the wireless transmitter 20 is different from the CLA 120 of FIG. 1. The CLA 120 utilizes the antenna 124 specialized for transmitting the FM signal, whereas the wireless transmitter 20 does not utilize an exposed transmitting antenna or an internal transmitting antenna installed on a printed circuit board, and takes the cable 24 of power transmission as a transmitting antenna to transmit the FM signal SA1 and/or the FM signal SA2 to the air. In other words, the cable 24 utilized in the wireless transmitter 20 is not only used for transmitting power, but is also used for transmitting the FM signals. In addition, the FM signal S1 generated by the satellite radio receiver is also transmitted through the cable 24, so that the satellite radio receiver does not need to utilize an FM transmitting antenna. Therefore, placement of the satellite radio receiver in a vehicle is more flexible.

The wireless transmitter 20 of FIG. 2 is an embodiment of the present invention, and those skilled in the art can make alternations and modifications accordingly. Since the DC source outputted from the power converting unit 202 usually includes the noises, the power converting unit 214 in practical is a constant voltage regulator for generating a clearer DC source than the DC source outputted from the power converting unit 202, for increasing audio quality of the FM signals amplified by the amplifier 210. In other embodiments of the present invention, the power converting unit 214 and the amplifier 210 can be omitted in a certain condition without affecting the FM signal transmission function of the wireless transmitter 20.

Figure 3:
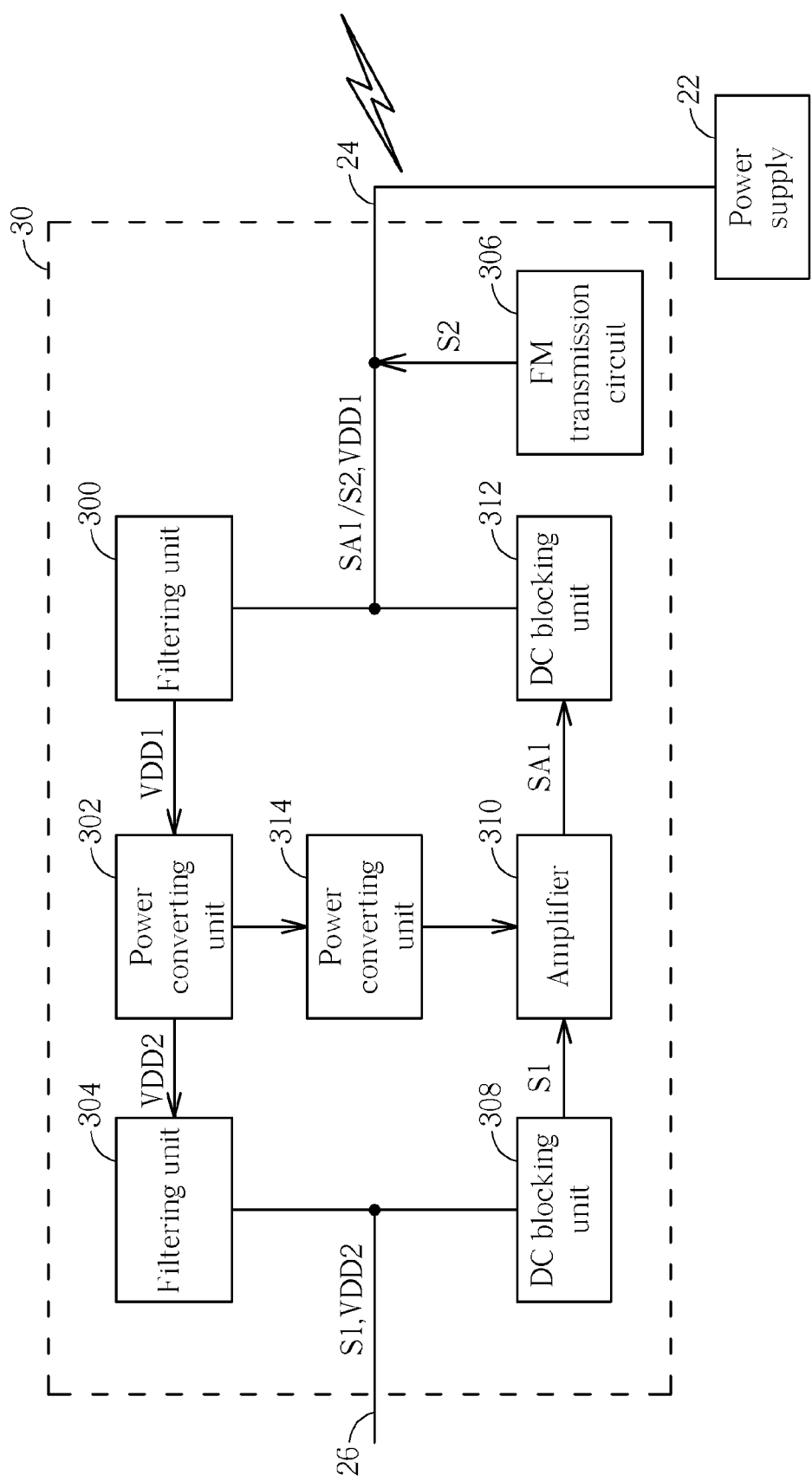

In addition, as can be seen in FIG. 3, if power of the FM signal S2 generated by the FM transmission circuit 206 is larger than a predetermined value, the FM signal S2 is not needed to be amplified by the amplifier 210. FIG. 3 is a schematic diagram of a wireless transmitter 30 according to an embodiment of the present invention. The wireless transmitter 30 includes filtering units 300 and 304, power converting units 302 and 314, an FM transmission circuit 306, DC blocking units 308 and 312, and an amplifier 310. The wireless transmitter 30 is coupled to the power supply 22 through the cable 24, and is coupled to a satellite radio receiver through the cable 26. Besides the FM transmission circuit 306, functions and coupling relationships of the circuit units in FIG. 3 are similar to the functions and coupling relationships of the circuit units in FIG. 2, so the detailed description is omitted herein. The function of the FM transmission circuit 306 is the same with the function of the FM transmission circuit 206. When a multimedia player is coupled to the wireless transmitter 30, audio data played by the multimedia player is converted into the FM signal S2 by the FM transmission circuit 306. Unlike FIG. 2, the FM transmission circuit 306 is coupled to the cable 24, and the FM signal S2 generated by the FM transmission circuit 306 is not amplified through the amplifier 310, but is transmitted with the DC source transmitted on the cable 24 and the amplified FM signal SA1 to the air through the cable 24 as a transmitting antenna.

Figure 4:
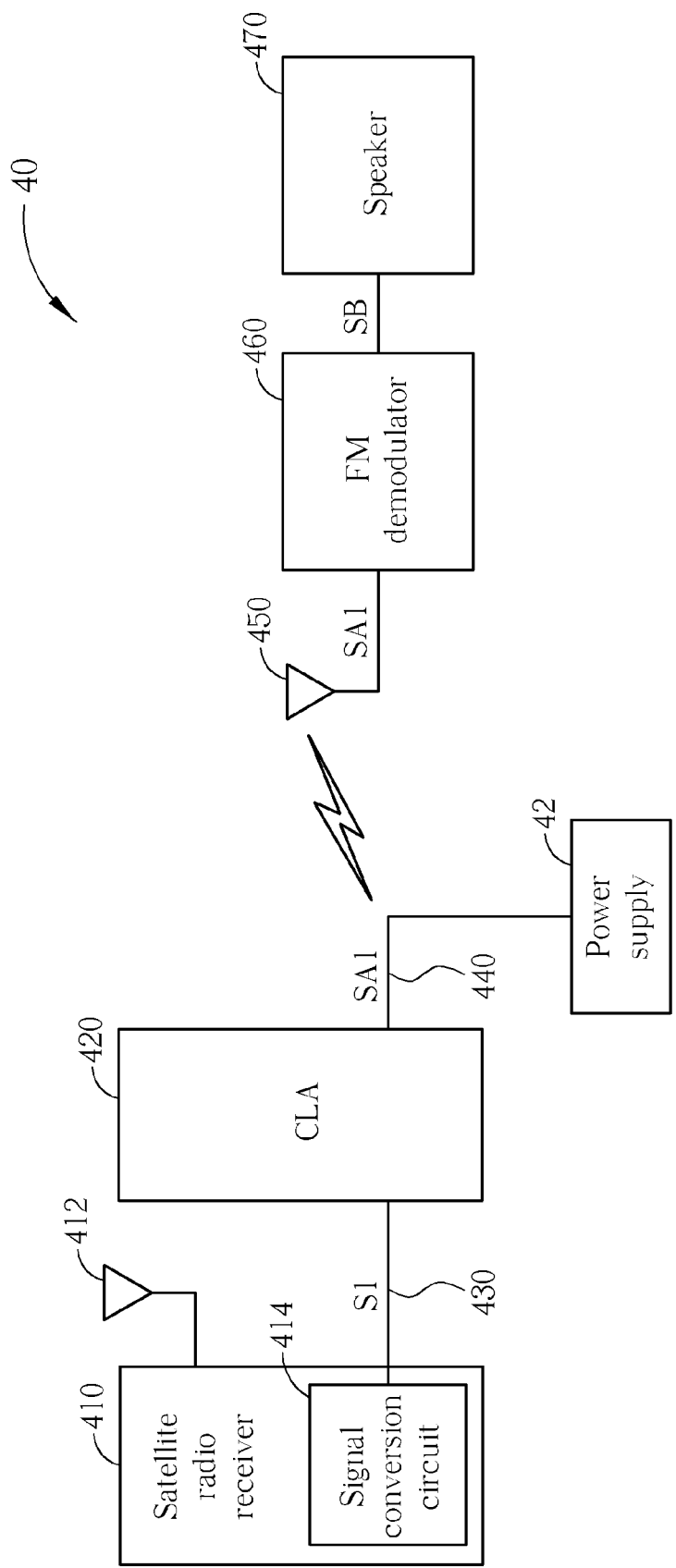
FIG. 4 is a schematic diagram of a vehicle multimedia system according to an embodiment of the present invention.

Please refer to FIG. 4, which is a schematic diagram of a multimedia system 40 according to an embodiment of the present invention. The multimedia system 40 is a vehicle multimedia system, which includes a satellite radio receiver 410, a CLA 420, cables 430 and 440, an FM receiving antenna 450, an FM demodulator 460, and a speaker 470. The satellite radio receiver 410 includes a satellite receiving antenna 412 and a signal conversion circuit 414, where the satellite receiving antenna 412 is used for receiving a satellite radio signal, and the signal conversion circuit 414 is used for converting the satellite radio signal received by the satellite receiving antenna 412 into an FM signal S1. The CLA 420 can be the abovementioned wireless transmitter 20 or 30, and is used for converting a DC source outputted from a power supply into another DC source required by the satellite radio receiver 410, and transmitting the DC source to the satellite radio receiver 410 through the cable 430. Meanwhile, the CLA 420 amplifies the FM signal S1 generated by the satellite radio receiver 410 to generate the FM signal SA1, and transmits the FM signal SA1 to the FM receiving antenna 450 through the cable 440. Regard to circuit and detailed operation of the CLA 420, please refer to the abovementioned wireless transmitters 20 and 30. The cable 430 is used for transmitting the DC source with the FM signal, and has to be a coaxial cable. The cable 440 is used as a transmission cable and a transmitting antenna, which can be a conventional DC cable and is not necessary to be a coaxial cable. The FM receiving antenna 450 is used for receiving the FM signal SA1 transmitted from the cable 440. The FM demodulator 460 is coupled to the FM receiving antenna 450 and the speaker 470, and is used for demodulating the FM signal SA1 to generate a baseband audio signal SB for the speaker 470 playing. Please note that, the multimedia system 40 utilizes the wireless transmitter of the present invention, and therefore the CLA 420 not only transmits the FM signal SA1 through the cable 440, but also transmits the FM signal generated from audio signal of the external multimedia player through the cable 440. Please refer to FIG. 2 and FIG. 3 for related signal description, so the detailed description about the signal in FIG. 4 is omitted.

In conclusion, when the wireless transmitter of the present invention is used as the CLA, the external satellite radio receiver does not need a dedicated FM transmitting antenna. Both of the satellite radio receiver and the CLA utilize the power line between the CLA and vehicle power supply as the transmitting antenna of the FM signal. According to the present invention, the FM transmission function of the CLA is not limited in a shape of the CLA, and thereby the audio signal quality has enough room to be improved, and the placement of the satellite radio receiver in the vehicle is more flexible.

Those skilled in the art will readily observe that numerous modifications and alterations of the device and method may be made while retaining the teachings of the invention.

What is claimed is:

1. A wireless transmitter comprising:
   a first filtering unit coupled to a first cable, for filtering out a first frequency modulation (FM) signal transmitted on the first cable, and outputting a first direct current (DC) source transmitted on the first cable;
   a first power converting unit coupled to the first filtering unit, for converting the first DC source into a second DC source;
   a second filtering unit coupled to the first power converting unit, for eliminating noise in the second DC source;
   a first DC blocking unit for blocking the second DC source and outputting a second FM signal;
   an amplifier coupled to the first DC blocking unit, for amplifying the second FM signal to generate the first FM signal; and
   a second DC blocking unit coupled to the amplifier and the first cable, for blocking the first DC source transmitted on the first cable from the amplifier, and outputting the first FM signal to the first cable, to transmit the first FM signal to the air.

2. The wireless transmitter of claim 1, wherein the first cable is further coupled to a power supply, for transmitting the first DC source generated by the power supply to the first filtering unit.

3. The wireless transmitter of claim 1, wherein the second filtering unit is further coupled to a second cable for transmitting the second DC source.

4. The wireless transmitter of claim 1, wherein the second FM signal is generated by a satellite radio signal converted by a satellite radio receiver.

5. The wireless transmitter of claim 1, wherein the first DC blocking unit is further coupled to a second cable for transmitting the second FM signal to the first DC blocking unit.

6. The wireless transmitter of claim 1 further comprising a second power converting unit coupled between the first power converting unit and the amplifier, for generating power required by the amplifier.

7. The wireless transmitter of claim 1 further comprising an FM transmission circuit coupled to the first DC blocking unit, for generating a third FM signal.

8. The wireless transmitter of claim 1 further comprising an FM transmission circuit coupled to the first cable, for generating a third FM signal transmitted to the air through the first cable.

9. The wireless transmitter of claim 1, wherein the first FM signal and the second FM signal are satellites radio signals in an FM form.

10. A multimedia system comprising:
    a frequency modulation (FM) receiving antenna for receiving a first FM signal;
    an FM demodulator coupled to the FM receiving antenna, for demodulating the first FM signal to generate a baseband audio signal;
    a speaker coupled to the FM demodulator, for playing the baseband audio signal;
    a first cable coupled to a power supply, for transmitting the first FM signal and a first DC source generated by the power supply;
    a second cable for transmitting a second FM signal and a second DC source;
    a satellite radio receiver coupled to the second cable, for converting a satellite radio signal into the second FM signal; and
    a wireless transmitter coupled to the first cable and the second cable, for converting the first DC source into the second DC source, and amplifying the second FM signal to generate the first FM signal, wherein the first FM signal is transmitted to the FM receiving antenna through the first cable.

11. The multimedia system of claim 10, wherein the wireless transmitter comprising:
    a first filtering unit coupled to the first cable, for filtering out the first FM signal, and outputting the first DC source;
    a first power converting unit coupled to the first filtering unit, for converting the first DC source into the second DC source;

a second filtering unit coupled to the first power converting unit and the second cable, for eliminating noise in the second DC source;

a first DC blocking unit coupled to the second cable, for blocking the second DC source and outputting the second FM signal;

an amplifier coupled to the first DC blocking unit, for amplifying the second FM signal to generate the first FM signal; and a second DC blocking unit coupled to the amplifier and the first cable, for blocking the first DC source transmitted on the first cable from the amplifier, and outputting the first FM signal to the first cable.

12. The multimedia system of claim 11 further comprising a second power converting unit coupled between the first power converting unit and the amplifier, for generating power required by the amplifier.

13. The multimedia system of claim 11 further comprising an FM transmission circuit coupled to the first DC blocking unit, for generating a third FM signal.

14. The multimedia system of claim 11 further comprising an FM transmission circuit coupled to the first cable, for generating a third FM signal transmitted to the air through the first cable.

15. The multimedia system of claim 11, wherein the first FM signal and the second FM signal are satellites radio signals in an FM form.

16. The multimedia system of claim 10, wherein the first cable is a DC cable, and the second cable is a coaxial cable.

17. The multimedia system of claim 10, wherein the second DC source is power required by the satellite radio receiver.

\* \* \* \* \*